United States Patent
Dubs et al.

(10) Patent No.: US 10,572,591 B2
(45) Date of Patent: Feb. 25, 2020

(54) INPUT INTERPRETATION BASED UPON A CONTEXT

(71) Applicant: Lenovo (Singapore) Pte. Ltd., Singapore (SG)

(72) Inventors: Justin Tyler Dubs, Raleigh, NC (US); Robert James Kapinos, Durham, NC (US); Russell Speight VanBlon, Raleigh, NC (US); Axel Ramirez Flores, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 47 days.

(21) Appl. No.: 15/355,682

(22) Filed: Nov. 18, 2016

(65) Prior Publication Data

US 2018/0143971 A1    May 24, 2018

(51) Int. Cl.
*G06F 17/27*    (2006.01)

(52) U.S. Cl.
CPC ........ *G06F 17/2785* (2013.01); *G06F 17/273* (2013.01); *G06F 17/274* (2013.01)

(58) Field of Classification Search
None
See application file for complete search history.

(56) References Cited

U.S. PATENT DOCUMENTS

| | | | | |
|---|---|---|---|---|
| 6,757,362 B1* | 6/2004 | Cooper | ............... | H04M 3/527 379/88.01 |
| 7,362,698 B2* | 4/2008 | Christensen | ...... | H04L 29/06027 370/217 |
| 8,402,032 B1* | 3/2013 | Brunsman | ............. | G06F 17/278 707/748 |
| 9,047,268 B2* | 6/2015 | Ouyang | ................ | G06F 3/0237 |
| 2007/0043571 A1* | 2/2007 | Michelini | ............ | G10L 15/1815 704/270.1 |
| 2009/0052636 A1* | 2/2009 | Webb | ................ | H04M 3/53333 379/88.14 |
| 2014/0067730 A1* | 3/2014 | Kozloski | ............... | G06N 7/005 706/12 |
| 2014/0136184 A1* | 5/2014 | Hatsek | .................. | G06F 17/278 704/9 |
| 2014/0327622 A1* | 11/2014 | Ouyang | ............. | G06F 3/04897 345/169 |
| 2014/0354527 A1* | 12/2014 | Chen | ....................... | G06F 3/017 345/156 |
| 2016/0135046 A1* | 5/2016 | John Archibald | .... | H04W 12/06 455/411 |
| 2016/0151918 A1* | 6/2016 | Stoyanchev | ........ | G06F 17/2785 700/246 |
| 2016/0161946 A1* | 6/2016 | Wuth Sepulveda | ......................... | G05D 1/0022 701/2 |

(Continued)

*Primary Examiner* — Neeraj Sharma
(74) *Attorney, Agent, or Firm* — Ference & Associates LLC

(57) ABSTRACT

One embodiment provides a method, including: receiving, at an information handling device, an indication to perform an action associated with an element in an application; adjusting, using a processor, a confidence score of the element based upon at least one input context; responsive to the confidence score being higher than a predetermined threshold, performing the action; and responsive to the confidence score being lower than the predetermined threshold, performing a second action. Other aspects are described and claimed.

18 Claims, 3 Drawing Sheets

(56) References Cited

U.S. PATENT DOCUMENTS

2016/0253989 A1\* 9/2016 Kuo ...................... G10L 15/183
704/257
2016/0358603 A1\* 12/2016 Azam ..................... G10L 15/22
2017/0068659 A1\* 3/2017 Rothwell .............. G06F 17/278
2017/0220677 A1\* 8/2017 Kazi ................ G06F 17/30684

\* cited by examiner

INPUT INTERPRETATION BASED UPON A CONTEXT

BACKGROUND

Information handling devices ("devices"), for example cell phones, smart phones, tablet devices, laptop computers, and the like permit users to communicate with other users by sending and receiving textual data, e.g., text messages, emails, notifications, etc. Oftentimes, textual messages are sent with errors (e.g., misspellings, unintentional word insertions, etc.) that the writer either did not realize were present or mistakenly inserted.

BRIEF SUMMARY

In summary, one aspect provides a method, comprising: receiving, at an information handling device, an indication to perform an action associated with an element in an application; adjusting, using a processor, a confidence score of the element based upon at least one input context; responsive to the confidence score being higher than a predetermined threshold, performing the action; and responsive to the confidence score being lower than the predetermined threshold, performing a second action.

Another aspect provides an information handling device, comprising: a processor; a memory device that stores instructions executable by the processor to: receive an indication to perform an action associated with an element in an application; adjust a confidence score of the element based upon at least one input context; responsive to the confidence score being higher than a predetermined threshold, perform the action; and responsive to the confidence score being lower than the predetermined threshold, perform a second action.

A further aspect provides a product, comprising: a storage device that stores code, the code being executable by a processor and comprising: code that receives an indication to perform an action associated with an element in an application; code that adjusts a confidence score of the element based upon at least one input context; responsive to the confidence score being higher than a predetermined threshold, code that performs the action; and responsive to the confidence score being lower than the predetermined threshold, code that performs a second action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
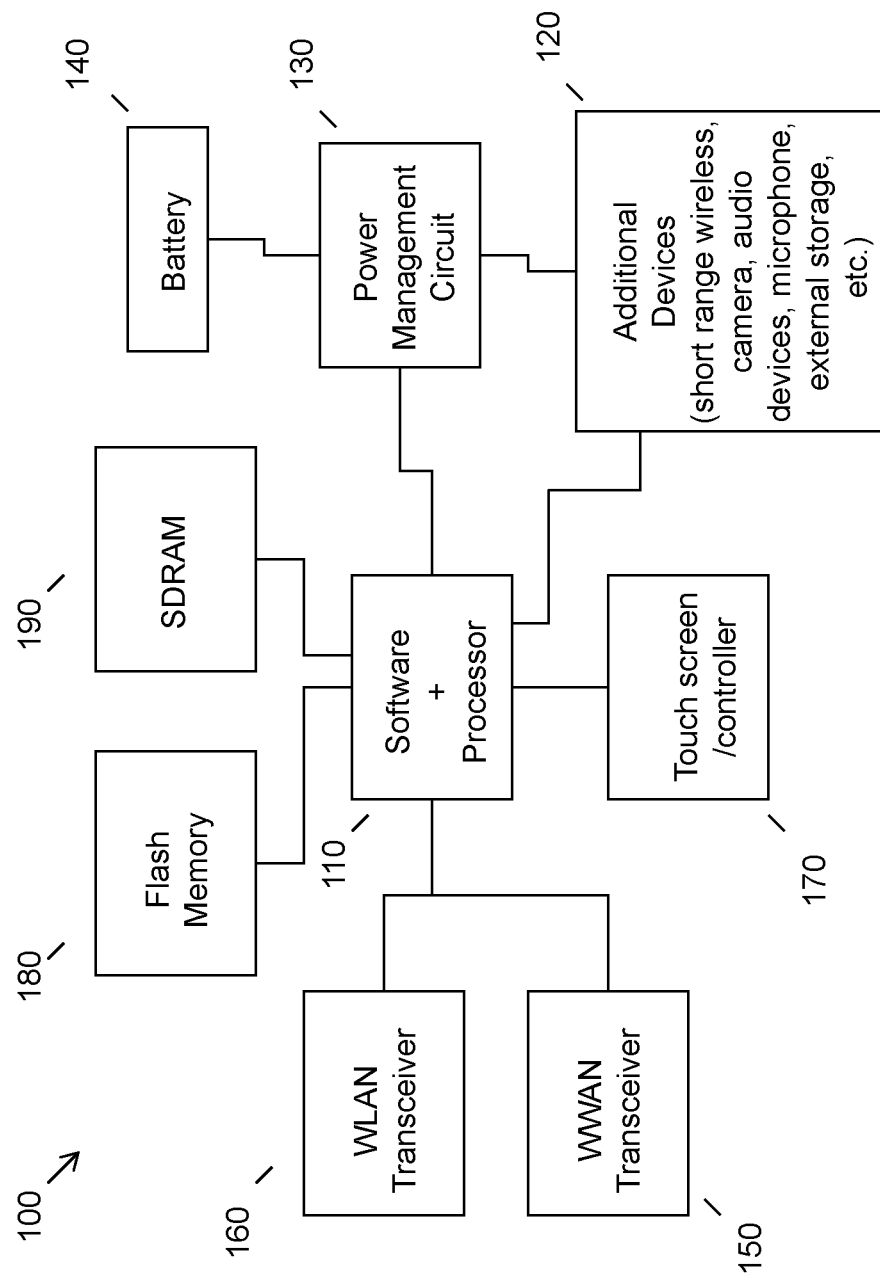
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The presence of errors (e.g., grammatical errors, misspellings, unintentional word insertions, etc.) in textual communications (e.g., text messages, email, social media posts, etc.) between users may result in numerous issues. For example, confusion may occur when a user sends a message with a misspelled word or unintentionally hits a "send" button before completing their entire message. The recipient may not understand, or may misinterpret, the meaning of the message. If the user notices the error immediately, they would likely need to send a second message in order to clarify the meaning of the original message. If the user does not notice the error immediately, then the recipient may be forced to guess what the original message intended to convey or may be forced to send a reply message asking for clarification. This clarification process is both timely and cumbersome. Additionally, an error filled textual communication exchanged in a work environment (e.g., with an employer, co-worker, client, etc.) may reflect poorly on the sender and may negatively affect their reputation in the workplace.

Spell check features may be helpful to users in the construction of their textual communications to prevent users from sending a communication that contains errors. An example of a common spell check feature involves the highlighting of a misspelled word and providing a list of autocorrect suggestions to replace the highlighted word with. For example, if a user intended to type, "I will be there soon" but instead types "I will be thr soon," a feature may highlight "thr" and provide a list of replacement suggestions (e.g., in a popup window) to replace "thr" with a different word.

Conventional spell check replacement functions, however, still do not completely prevent a user from sending a message that contains at least one error. One issue relates to the location of the autocorrect suggestion list. Oftentimes when a user attempts to select a replacement word, they may unintentionally hit another key instead. For example, a user attempting to accept an autocorrect suggestion may accidently hit the "send" button because the autocorrect suggestion was located close to the "send" button. The message is then sent containing the misspelled word. Another issue relates to the ability of a user to review their typed message.

For example, if a user is in a hurry they may not have time to review the message before it is sent. Alternatively, a user may instinctively tap the "send" button at the moment the message is complete. In both scenarios, the message would be sent with an error.

Accordingly, an embodiment provides a method of interpreting user input in an application based upon the attributes of an input context (e.g., application type, input type, input location, grammar of input, etc.). In an embodiment, a confidence score may be assigned to an element (e.g., send button, exit button, delete button, etc.) and may be adjusted based upon attributes of the input context. If the confidence score is higher than a predetermined threshold, then an application may perform an action on the input (e.g., send the input, delete the input, etc.). For example, the confidence score of a "send" button in a text messaging application may be adjusted based upon whether the message contains spelling errors. If the application determines that there are misspelled words in the message, the confidence score of the "send" button is lowered below a predetermined threshold required to send a text message. Therefore, if a user presses the "send" button, the message is not sent. Such a method prevents users from accidently performing an action that may be destructive to their message or message's purpose.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
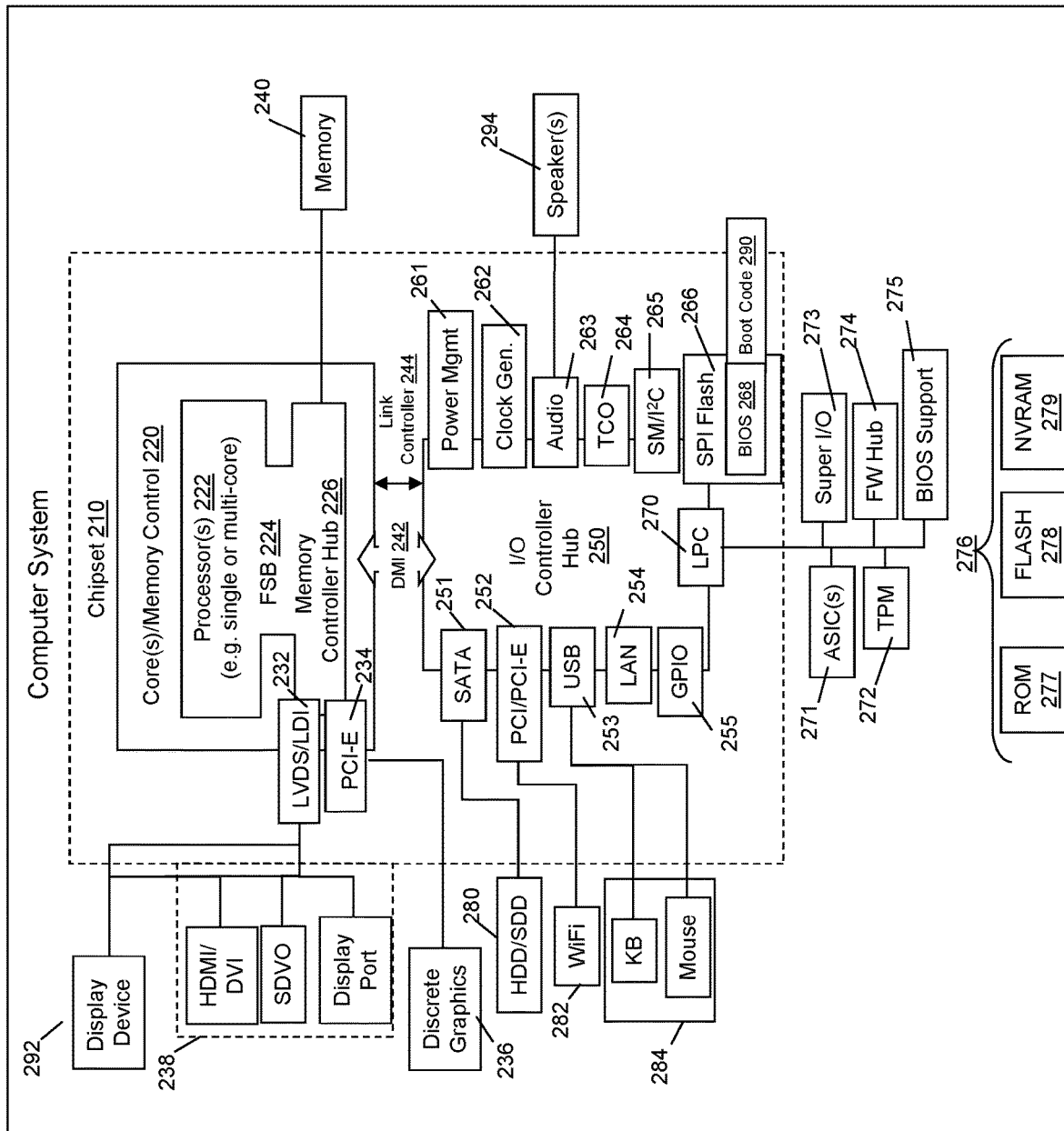
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may interpret user input based upon an input context. For example, the circuitry outlined in FIG. 1 may be implemented in a tablet or smart phone embodiment, whereas the circuitry outlined in FIG. 2 may be implemented in a personal computer embodiment.

Figure 3:
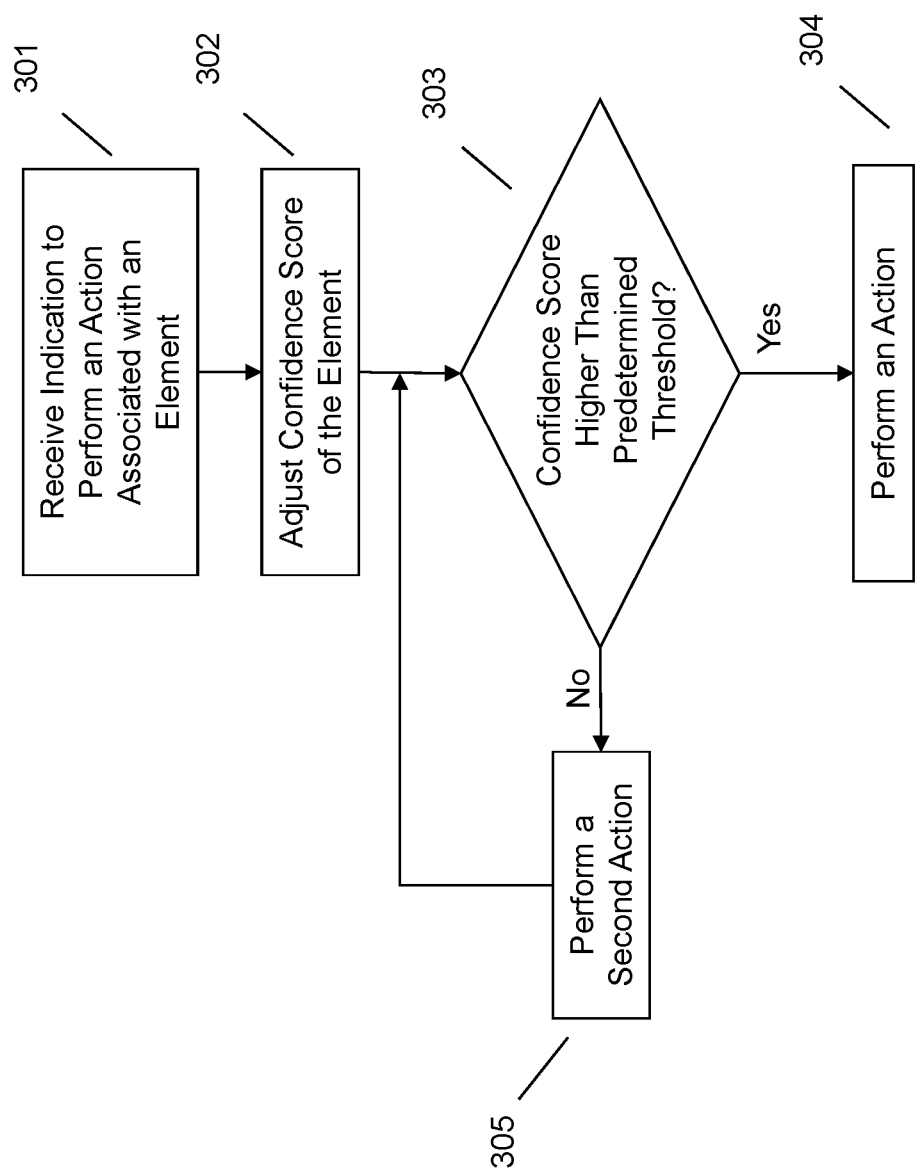
FIG. 3 illustrates an example method of performing an action associated with an element based on a context.

Referring now to FIG. 3, an embodiment may perform an action on a dataset when the confidence score of an element is higher than a predetermined threshold. At 301, an embodiment may receive an indication to perform an action on a dataset by an element in an application. The dataset may be a textual communication such as a text message, email message, social media post, and the like. The action may be a send action, delete action, search action, exit action, and the like. The element may be a control feature such as a send button, delete button, exit button, and the like. In an embodiment, the indication may be received by the application when a user selects the element through user input (e.g., touch input, stylus input, mouse click, etc.). For example, a user may press the "send" button in a text messaging application, indicating to the application to send the message to a designated recipient(s).

After an indication to perform an action on a dataset is received, an embodiment may adjust, at 302, a confidence score of an element based upon at least one context. In an embodiment, the context may be at least one of a variety of different contexts such as application type (e.g., text messaging application, email application, social media application, etc.), input type (e.g., touch input, stylus input, mouse click input, etc.), surface area of input (e.g., large surface area, small surface area, etc.), input location (e.g., the proximity of the input selection in relation to an element), and dataset grammar (e.g., punctuation in a dataset). While other contexts may be utilized, example embodiments will be further explained with regard to the aforementioned contexts.

In an embodiment, the confidence score of an element may be adjusted based on application type. For example, the confidence score of the "send" button in a text messaging application may be higher than that of the confidence score of the "send" button in a formal email application. This may mean, for example, that the dataset in the text message may have more grammatical errors than the dataset in the email.

In an embodiment, the confidence score of an element may be adjusted based on input type. For example, touch input on a "send" button in a messaging application received from a stylus may designate a higher confidence score than touch input from a user's finger, and vice versa. In an embodiment, a higher confidence score may be assigned to input having a smaller surface area and a lower confidence score may be assigned to input having a larger surface area. For example, touch input received on a "send" button having a large surface area (e.g., touch input from the palm of a user's hand) may designate a lower confidence score than input received having a smaller surface area (e.g., touch input from the tip of a user's finger).

In an embodiment, the confidence score of an element may be adjusted based upon the proximity of the input to the element. If an embodiment determines that the center of the input location is at a greater distance than a predetermined distance away from a center of the element, then a lower confidence score may be assigned to the element. For example, if a user attempts to accept an autocorrect suggestion within a text messaging application but accidently taps the "send" button with the side of their finger, perhaps because the suggestion was located so closely to the send button, a lower confidence score may be assigned to the send button because the location of the center of the user's input was not centered on the "send" button.

In an embodiment, the confidence score of an element may be adjusted based upon the grammar or completeness of the text in the dataset. If an embodiment determines that there is at least one spelling error in the dataset, then a lower confidence score may be assigned to an element (e.g., a "send" button). For example, if a user writes the message "Hello, how are you dng?" and presses the "send" button, an embodiment may determine that the message contains a spelling error and assigns a low confidence score to the "send" button. In an embodiment, a lower confidence score may be assigned to an element if an embodiment determines that textual data may be missing from the dataset. For example, if a user writes the partial text message "I'll meet you at" and then presses the "send" button, an embodiment may determine that the message was not complete and assigns a low confidence score to the "send" button. Conversely, if the user wrote "I'll meet you at 10 am," a higher confidence score may be assigned to the "send" button because an embodiment may determine that the message was complete.

In an embodiment, the confidence of a search button may be adjusted depending upon the content entered into the search box. For example, a user may enter a partial search term into a search box and intend to select a suggested search term from a drop down list of suggestions. However, if the user accidently presses the "search" button instead of a suggestion, an embodiment may assign a low confidence.

At 303, responsive to the confidence score being higher than a predetermined threshold, an application, at 304, may perform the designated action on the dataset. For example, if a user writes the message "Hello, how are you doing?" and presses the "send" button, an embodiment may determine that the message contains no spelling errors and assigns a high confidence score to the "send" button. If that confidence score is higher than the predetermined threshold for the "send" button, then message is sent to its designated recipient.

In an embodiment, the predetermined thresholds of each element may vary within an application. For example, in a text messaging application, the predetermined threshold of the "send" button may be higher than the predetermined threshold of the "exit" button. In an embodiment, the predetermined threshold of an element may be set based upon the type of application used. For example, a "send" button in a text messaging application may have a much lower predetermined threshold than a "send" button in an email application. In an embodiment, the predetermined threshold of an element may be adjusted based upon the recipient of the message. For example, if an embodiment determines that an email is addressed to a co-worker or client, the "send" button may have a higher predetermined threshold than an email sent to a friend.

If the confidence score is lower than a predetermined threshold, at 305, a second action may be performed on the data set. In an embodiment, the second action may comprise one of a variety of actions such as rejecting the original action, providing a notification to a user that the original action was rejected, querying the user whether they want to proceed with the original action despite the low confidence score, providing a suggestion(s) to the user of an action they may take to increase the confidence score of an element, and the like.

In an embodiment, the predetermined thresholds may be set by a user or may be determined dynamically. The instructions for utilizing a specific context may be set at the application level or at the operating system (OS) level. For example, in an embodiment, at the application level, instructions may be programmed into each individual application (e.g., text messaging application, email application, etc.) as to what the predetermined thresholds are for each element and how the presence or absence of different contexts may adjust the confidence score of the elements. Alternatively, an embodiment may dynamically determine the predetermined threshold of each element based upon its location on the screen. For example, most "exit" buttons are located in a same general portion of an application (i.e., the top right portion of the application window). An embodiment may determine that a button located in that location in the application window would require a higher confidence score when selected. In another embodiment, a set of instructions may be programmed into an OS that delineate the predetermined thresholds of all like elements throughout the applications and how the confidence scores of those elements are adjusted based upon the presence or absence of different contexts. For example, a specific predetermined threshold may be set for all "send" buttons throughout all applications utilized on the OS, while a different predetermined threshold is set for all "exit" buttons throughout all applications utilized on the OS.

The various embodiments described herein thus represent a technical improvement to the transmission of error-free textual communications. Using the techniques described herein, a user may be prevented from inadvertently sending a textual communication that contains an error. An embodiment adjusts the confidence score of an element based upon at least one context to determine whether or not an action corresponding to the element should be performed.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, an indication to perform an action on a dataset comprising a textual communication within a communication application, wherein the action controls a delivery of the textual communication, wherein the receiving an indication comprises receiving input at an element in the communication application, wherein the element comprises a control feature of the communication application and wherein the action corresponds to the control feature;
adjusting, using a processor, a confidence score of the action corresponding to the element based upon at least one input context, wherein the confidence score indicates a confidence that the action is to be performed by the communication application;
responsive to the confidence score being higher than a predetermined threshold, performing the action on the dataset, wherein the predetermined threshold is correlated to the communication application, wherein the predetermined threshold of the element is dynamically determined based upon the location of the element in the application; and
responsive to the confidence score being lower than the predetermined threshold, performing a second action with respect to the dataset, wherein the second action comprises rejecting the action unless additional user input is received to perform the action and suggesting a corrective action to the dataset.

2. The method of claim 1, wherein the action is at least one action selected from the group consisting of send, close, search, and delete.

3. The method of claim 1, wherein the element is a control feature selected from the group consisting of a send button, an exit button, a search button, and a delete button.

4. The method of claim 1, wherein the at least one context comprises at least one of an application type, an input type, an input location, and dataset grammar.

5. The method of claim 4, wherein the application type comprises at least one of a text message, an email, and a social media post.

6. The method of claim 5, wherein the predetermined threshold of the element is adjusted based on the application type.

7. The method of claim 1, wherein the confidence score of the element is decreased based upon the distance between a center of the input location and a center of the element.

8. The method of claim 4, wherein the confidence score of the element is decreased based upon the presence of grammatical errors.

9. The method of claim 1, wherein the second action comprises at least one action selected from the group consisting of rejecting the action, providing a notification to a user that the action was rejected, querying the user whether the action should be performed, and providing a suggestion to a user.

10. An information handling device, comprising:
a processor;
a memory device that stores instructions executable by the processor to:
receive an indication to perform an action on a dataset comprising a textual communication within a communication application, wherein the action controls a delivery of the textual communication, wherein the receiving an indication comprises receiving input at an element in the communication application, wherein the element comprises a control feature of the communication application and wherein the action corresponds to the control feature;
adjust a confidence score of the action corresponding to the element based upon at least one input context, wherein the confidence score indicates a confidence that the action is to be performed by the communication application;
responsive to the confidence score being higher than a predetermined threshold, perform the action on the dataset, wherein the predetermined threshold is correlated to the communication application, wherein the predetermined threshold of the element is dynamically determined based upon the location of the element in the application; and
responsive to the confidence score being lower than the predetermined threshold, perform a second action with respect to the dataset, wherein the second action comprises rejecting the action unless additional user input is received to perform the action and suggesting a corrective action to the dataset.

11. The information handling device of claim 10, wherein the action is at least one action selected from the group consisting of send, close, search, and delete.

12. The information handling device of claim 10, wherein the element is a control feature selected from the group consisting of a send button, an exit button, a search button, and a delete button.

13. The information handling device of claim 10, wherein the at least one context comprises at least one of an application type, an input type, an input location, and dataset grammar.

14. The information handling device of claim 13, wherein the application type comprises at least one of a text message, an email, and a social media post.

15. The information handling device of claim 14, wherein the predetermined threshold of the element is adjusted based on the application type.

16. The information handling device of claim 10, wherein the confidence score of the element is decreased based upon the distance between a center of the input location and a center of the element.

17. The information handling device of claim 13, wherein the confidence score of the element is decreased based upon the presence of grammatical errors.

18. A product, comprising:
a non-signal storage device that stores code, the code being executable by a processor and comprising:
code that receives an indication to perform an action on a dataset comprising a textual communication within a communication application, wherein the action controls a delivery of the textual communication, wherein the receiving an indication comprises receiving input at an element in the communication application, wherein the element comprises a control feature of the communication application and wherein the action corresponds to the control feature;
code that adjusts a confidence score of the action corresponding to the element based upon at least one input context, wherein the confidence score indicates a confidence that the action is to be performed by the communication application;
responsive to the confidence score being higher than a predetermined threshold, code that performs the action on the dataset, wherein the predetermined threshold is correlated to the communication application, wherein the predetermined threshold of the element is dynamically determined based upon the location of the element in the application; and
responsive to the confidence score being lower than the predetermined threshold, code that performs a second action with respect to the dataset, wherein the second action comprises rejecting the action unless additional user input is received to perform the action and suggesting a corrective action to the dataset.

* * * * *